United States Patent
Thiele et al.

[11] Patent Number: 6,153,239
[45] Date of Patent: Nov. 28, 2000

[54] METHOD FOR PRODUCING A SINGLE-USE CONTAINER AND MOLD FOR PRACTICING THE METHOD

[75] Inventors: Marion Thiele, Barensteiner Strasse 16/18, D-01277 Dresden; Wolfgang Linke, Dresden, both of Germany

[73] Assignee: Marion Thiele, Dresden, Germany

[21] Appl. No.: 09/303,921

[22] Filed: May 3, 1999

Related U.S. Application Data

[63] Continuation of application No. PCT/DE97/02510, Oct. 29, 1997.

[30] Foreign Application Priority Data

Nov. 1, 1996 [DE] Germany .......................... 196 46 752

[51] Int. Cl.$^7$ .................................................. A21D 13/00
[52] U.S. Cl. .......................... 426/138; 426/499; 426/514; 426/549
[58] Field of Search .................... 426/138, 143, 426/94, 549, 279, 277, 276, 499, 505, 514

[56] References Cited

U.S. PATENT DOCUMENTS 5,304,386 4/1994 Dugas et al. .............................. 426/94

FOREIGN PATENT DOCUMENTS

| | | |
|---|---|---|
| 0556774 | 2/1993 | European Pat. Off. . |
| 4208020 | 3/1982 | Germany . |
| 4106376 | 9/1992 | Germany . |
| 4221018 | 1/1994 | Germany . |
| 4239143 | 1/1994 | Germany . |
| 4235033 | 4/1994 | Germany . |
| 9018139 | 4/1996 | Germany . |
| 2147790 | 10/1983 | United Kingdom . |

*Primary Examiner*—Keith D. Hendricks
*Attorney, Agent, or Firm*—Baker Botts L.L.P.

[57] ABSTRACT

A single-use container is formed from a dough which includes a proportion by mass A of water in the range $A_{min}$ of about 30%, and $A_{max}$ about 35%; a proportion by mass B of a cereal flour blend of wheat and rye flour such that B is about 50%, and contains a proportion by mass $B_W$ of wheat flour and a proportion by mass $B_R$ of rye flour with the relationship, $1\% \leq B_W \leq 49\%$ and $B_R \approx 50\% - B_W$; a proportion by mass C of meal from comminuted dried baked goods, with C being about 10%, and a proportion by mass D of vegetable oil such that $D \approx A_{max} - A + 5\%$. The dough is placed into a mold and is baked in the mold, preferably under constant pressure. The resulting article is both water resistant and biodegradable.

13 Claims, 2 Drawing Sheets

METHOD FOR PRODUCING A SINGLE-USE CONTAINER AND MOLD FOR PRACTICING THE METHOD

SPECIFICATION

1. Reference to Related Application

This application is a continuation of International Application No. PCT/DE 97/02510 filed Oct. 29, 1997.

2. Field of the Invention

The invention relates to a process for producing a single-use container made of dough using cereal flour, molded and then baked, and a mold for practicing the method.

BACKGROUND OF THE INVENTION

Very often, foods are prepared in single-use containers, or so-called single-use utensils. Especially for foods intended for fast consumption, the expense of cleaning the utensils is thus saved.

Utensil parts made of paperboard have long been known. To be sure, the mere use of paperboard would lead to a very rapid softening of the single-use utensil, or single-use container, and early unserviceability thereof. For this reason, such utensil parts are generally provided with a coating impermeable to water.

The disadvantage of softening is avoided entirely with utensil parts of plastic.

However, these types of single-use utensil have the disadvantage that they entail a considerable environmental stress, because they are degraded only with difficulty or not at all.

To avoid this disadvantage, German Letters of Disclosure DE 4,235,033 A1 discloses an edible single-use plate and a method of producing said single-use plate.

It is there specified that this single-use plate is made from a bread dough by baking. The bread dough contains a rye flour component, not specified in detail. To produce the container mold, cores are provided on a baking tin, over which the bread dough is drawn in baking. Then the bread dough, with no further molding of the outer contour, is baked, leaving an irregular outer shape. If several containers are produced side by side in this manner, provision is made for perforations or incisions between the containers, permitting separation by the user.

After baking, the containers may be inverted, so that the concavity formed by the mold cores becomes the receiving cavity of the container.

Such containers made of bread dough may be used for short-term serving of foods. Here, they are especially suitable for human consumption, but may alternatively be disposed of as animal feed if not consumed. A problem is the prolonged keeping of foods in such containers, since softening is to be expected after only a short time. Besides, such containers manifest a rather bulky outer shape, so that they would seem unsuitable for mass consumption.

German Patent 4,239,143 C2 likewise specifies an edible container whose primary function, however, consists in shaping containers intended for consumption of edible ices in their final form directly on the seller's premises, thus avoiding transport of prefabricated ice containers, which regularly leads to considerable losses due to fragility. For this purpose, in a first heating and baking step, containers are produced in the form of a baked waffle. These are then remoistened and packaged. Owing to the remoistening, the sheets become soft and are transportable with no problems. On the consumer's premises, these sheets can then be removed, dried in another heating step, and finally shaped into their final form. Such containers, owing to the requisite dough composition, have an endurance of several minutes after loading with edible ice, regularly sufficient in the consumption of edible ices. However, use of such edible containers for serving other foods, especially over longer periods of time, is not feasible.

German Letters of Disclosure 4,106,376 A1 likewise disclose a hollow baked product usable as an edible utensil. Here, a dough is pre-formed by a heating operation in a mold chamber. Then, the dough is baked open. Here, the premise is that a rising dough is employed, filling the mold chamber completely in the baking process after a rising operation.

For mass production of such containers, the two necessary steps of heating and then baking uncovered appear to involve a considerable outlay. Besides, the rising dough exhibits a comparatively low long-term stability upon incorporation in food, since moisture contained in the foods may enter the residual gas inclusions with comparative ease, thus softening the container from the inside.

Lastly, German Letters of Disclosure 4,221,018 A1 disclose a single-use container, preferably in the shape of a dish, produced using dough prepared from cereal flour and water, molded and then baked or dried.

This known method provides that the dough be prepared using lye as liquid component. This utilizes the property of the lye that coagulates the albumen contained in the dry substance, for example in the flour, with the lye. The consequent coagulation of the protein forms a lattice filled by the fillers still remaining in the dough, such as starch, cellulose and the like. This method yields products of a leather-like consistency, possessing a good density and resistance to softening.

A disadvantage of this method is that for reliable preparation, a sufficient proportion of coagulable albumen must always be present. Thus, in German Letters of Disclosure 4,221,018 A1, albumen proportions from 10 to 20% of the dry substance are specified.

To achieve such a high protein content, a first possibility consists in employing wheat flour of high purity. Wheat flour has a protein content of 11.2 mass-%, but rye flour by contrast only 7.5 mass-% for example. Protein separated from cereal flour may also be added to the dough. The first case shows that dough in which only wheat flour is used is difficult to detach from the substrate upon kneading. Such dough therefore involves considerable processing difficulty, a disadvantage especially for purposes of mass production.

The second possibility, that is, addition of protein, has the disadvantage that such protein supplementation involves an additional expenditure.

SUMMARY OF THE INVENTION

The object of the invention, then, is to render the production of biologically utilizable single-use containers more economical, with good workability.

According to the invention, this object is accomplished in that the dough has the form of a solid dough. Thus, this dough is kneaded with a mass proportion of water A such that $A_{min}=30\% \leq A \leq 35\%=A_{max}$ with a mass proportion B of a cereal flour blend of wheat and rye flour such that B=50%, a mass proportion $B_w$ of wheat flour and a mass proportion $B_R$ of rye flour are to each other as $1\% \leq B_w \leq 49\%$ and $B_R=50\%-B_w$.

with a mass proportion C of meal from comminuted dried baked goods, such as ground-up rolls, such that $C \approx 10\%$ and with a mass proportion D of vegetable oil such that
$D \approx A_{max} - A + 5\%$.

This kneaded solid dough is used to make a loaf, which is placed in a mold and baked. The rye flour component in this dough has the effect that upon kneading, and also upon placement in the mold, it separates very easily from the substrate. A comparatively low proportion of water avoids any vigorous evolution of steam inside the mold, regularly leading to a structural alteration of the single-use container owing to the tendency to escape from the mold. Finally, the proportion of oil provides for smooth processability despite the relatively low proportion of water in the solid dough.

In one embodiment of the invention, provision is made for flavorings and/or colorings to be added to the dough.

By the addition of colorings, the single-use container can be adapted to given esthetic requirements. Thus, for example, there is the possibility of blue coloration by bilberry or elderberry juice, yellow coloration by saffron, green coloration by spinach, etc. It may also be expedient to influence the flavor by means of flavorings, if not only the degradability or the possible use of the single-use utensil as animal feed but also its direct consumption is intended. For this purpose, for example the addition of common salt, garlic juice or granulate is possible. Paprika would influence both coloring and flavoring.

In another embodiment of the invention, it is provided that the mass proportion $B_W$ of wheat flour and the mass proportion $B_R$ of rye flour shall be approximately equal.

Such a composition of the cereal flour components provides an especially good processability and also an especially ready detachment of the dough from a substrate.

In another embodiment of the invention, provision is made for the mass proportions in the dough to represent the following quantities:

A=34.9%

$B_W=B_R=24.9\%$

C=10%

D=5% with a mass proportion E of common salt of 0.3%.
Such mass proportions result in a smoothly kneadable solid dough, readily detachable from a substrate and hence suitable for mass production.

In another embodiment of the method according to the invention, provision is made for the loaf to be formed as a slab of dough and for a portion of the slab to be placed in the mold. In this way, various shapes of single-use containers may be produced, while the trimmings from the parting or punching of the slab parts can always be re-used, being kneaded into a fresh batch of dough.

Furthermore, even residues already baked in the course of production or fragmented single-use containers may be recycled into the process of production, by grinding them and adding them as meal to the dough, corresponding to component C.

Another possibility consists in shaping the loaf as a ball and placing the ball in the mold, the closing of the mold forming the shape of the loaf according to the single-use container to be produced.

It is especially expedient for the pressure in the mold to be kept constant throughout the baking operation. This implies that the mold is in itself yielding, since the dough experiences an increase of volume during the baking operation, leading to a pressure rise in the case of a rigid mold. As a result of the constant pressure, however, in the first place, the shape is fixed; but, on the other hand, the water can escape in the form of steam without affecting the structure of the single-use container.

Here, it is especially advantageous for the mold to be compressed by gravity. Gravity then constitutes the constant pressure leading to the advantages outlined.

One possibility is to place the dough-filled mold in a circulating air hearth and bake at approximately 200° C. for 20 to 30 minutes. This baking operation produces an acceptable baked single-use container of somewhat brownish coloration, which can be removed from the mold after a brief cooling-off period of some seconds.

Another possibility for initiating the baking operation is for the mold to be heated directly, carrying out a contact baking process for 2 to 6 minutes. The advantage of this baking operation lies in the comparatively short baking time. Thus, economical mass production is possible.

In a modification of the method according to the invention, provision is made for using a microwave-compatible mold and subjecting the dough-filled mold to microwave radiation for baking or to support the baking process.

The microwave radiation serves to support the process of baking by means of heat. In this way, the baking operation can proceed more rapidly, enhancing productivity.

Also by microwave radiation, an external browning due to the action of heat may be diminished—or even completely eliminated, in the case of baking by microwave alone. In this way, it is possible to obtain a very light coloration of the single-use container. The color design of single-use containers may also be improved in this way, since any interfering brown coloration in substantially avoidable.

In another modification of the method according to the invention, provision is made for applying a water-repellent coating to the single-use container after the baking operation. To be sure, in the case of the single-use container according to the invention, the liquid content will not soak through for some time, i.e. only after several hours, but with the water-repellent coating, this time can be prolonged considerably. Thus, it becomes possible to store foods in the single-use container for a considerable length of time, for example placing them in commerce.

Also in this manner, the conditional microwaveability of the single-use container may be utilized for keeping prepared foods in the single-use container itself and, if necessary, reheating them therein by means of microwave radiation. This would for example admit of an application to the serving of meals to airplane passengers.

The stated problem of the invention is solved also by means of a mold for practicing the method, characterized by a bottom mold having the inverse shape of the under side of the single-use container and a top mold having the inverse shape of the top of the single-use container. The top mold may be placed on the bottom mold with the loaf of dough in between. The bottom mold, at least in an inner area away from the edge, comprises steam exit orifices. This mold forces the loaf of dough into its final shape. Here, it is possible for steam formed in the baking, operation to escape to the outside through the exit orifices. Here, it is necessary to provide such steam exit orifices at least in the inner area, since in the marginal area, it is possible for steam to escape at the edge of the mold. The top mold will as a rule be plain, that is, without steam exit orifices, so that the surface structure of the single-use container can be made smooth on the inside.

It is expedient to provide a weighting piece for the top mold having at least five times the weight of the top mold. By means of such a weighting piece, a sufficient compression is achieved due to the force of gravity of the weighting piece.

BRIEF DESCRIPTION OF THE DRAWINGS

The invention will now be illustrated in more detail in terms of an embodiment by way of example. In the accompanying drawings.

DETAILED DESCRIPTION OF PREFERRED EMBODIMENTS

A solid dough is kneaded to the following recipe:

0.500 kg wheat flour 0.500 kg rye flour 0.200 kg roll crumbs;

0.7 liter of water;

0.100 kg oil; and 0.050 kg salt

Flour is classified in various types of meal. These types of meal in turn affect the color of the finished product. It is expedient to employ wheat flour of type T 405 or 505 and rye flour of type T 997.

This dough, after the kneading process, is rolled into a loaf in the form of a dough slab 1. By means of a cutter 2, loaves 3 are punched out of the slab 1. These loaves 3 substantially correspond to the shape of the single-use container to be produced. In principle, round loaves for plates and dishes or the like, oval loaves for oval dishes, or dishes with handles suggest themselves. Rectangular loaves may also serve for angular containers.

Figure 1:
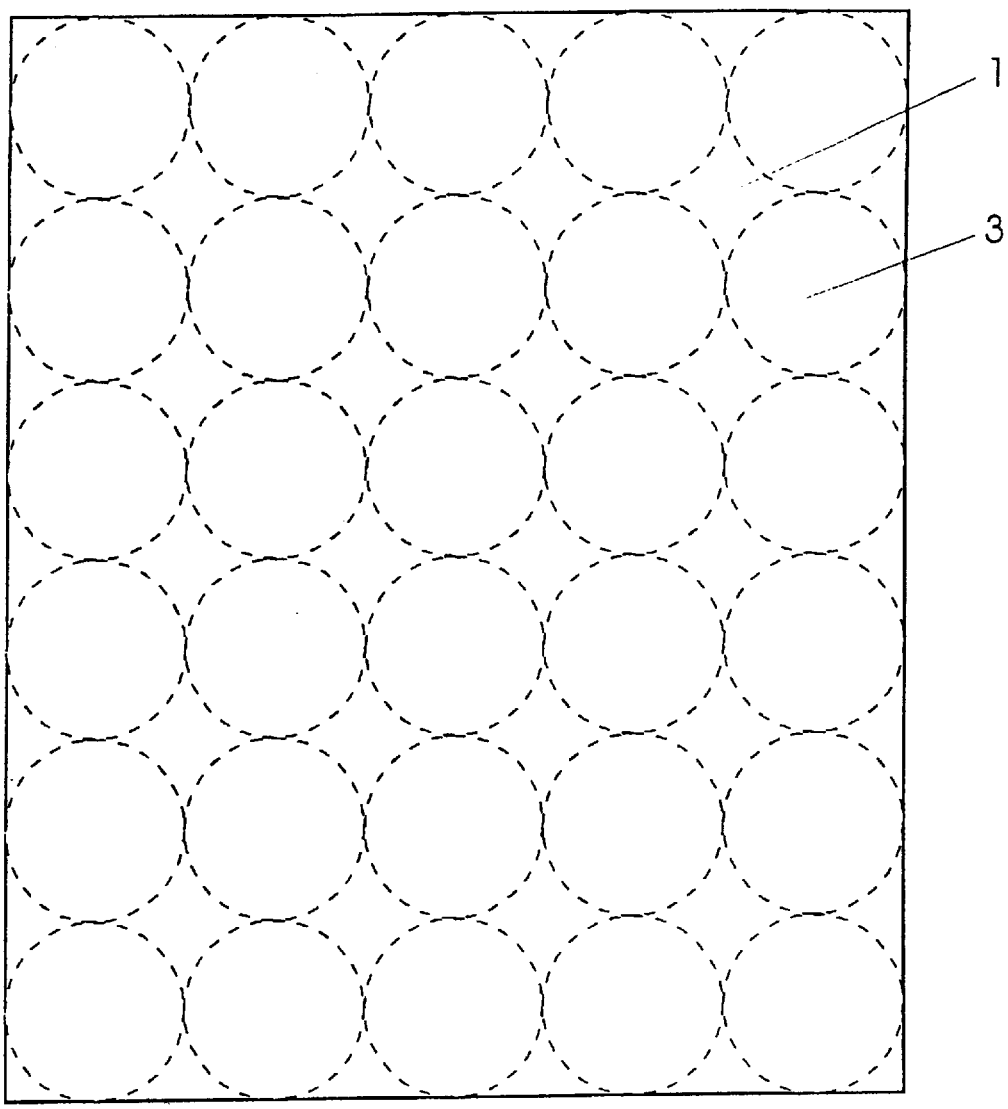
FIG. 1 shows a slab of dough.
Figure 2:
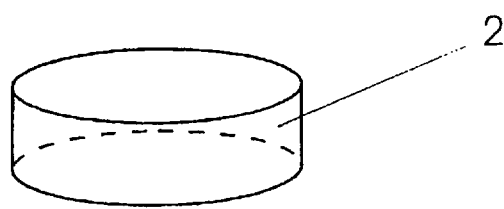
FIG. 2 a loaf cutter.
Figure 3:
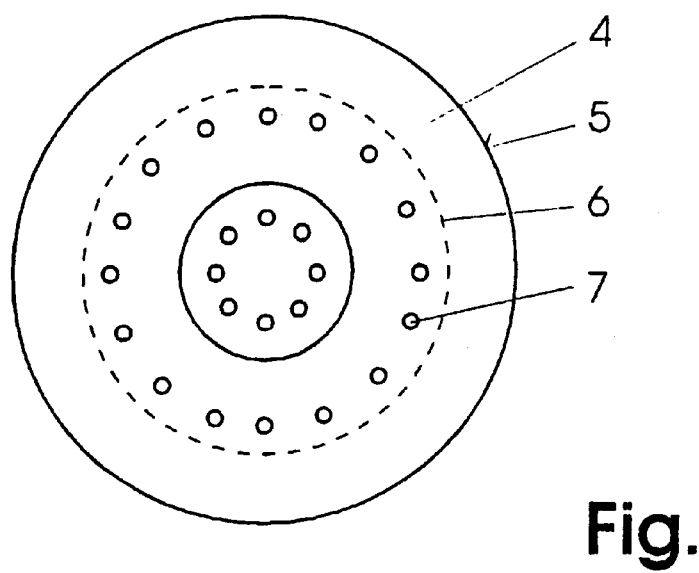
FIG. 3 a bottom mold of a mold according to the invention.
Figure 4:
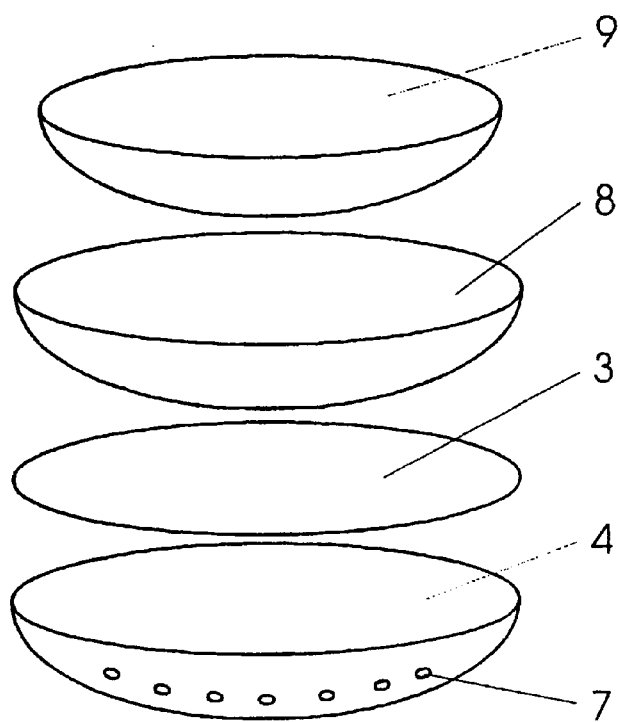
FIG. 4 an exploded view of a mold equipped with lump of dough and weighting piece.

As shown in FIGS. 2, 3 and 4 a bottom mold 4 is provided. This bottom mold 4 provides steam exit orifices 7 in its inner area 6 distant from the margin 5. The loaf 3 is placed in this bottom mold 4 and pressed into the inner contour of the bottom mold 4 by means of a top mold 8. Then, the weighting piece 9 is placed on the top mold 8. With this weighting piece, which by its gravity adjusts the pressure, the mold is placed in a circulating-air hearth and baked at about 200° C. for 20 to 30 minutes. The result is a single-use container following the inner contours of the bottom mold and the top mold, and having a slight brownish coloration. According to the surface finish of the under side of the top mold 8, the inside of the single-use container may have either a matte or a glossy surface texture.

In principle, the materials of the bottom and top molds will affect the appearance of the finished single-use container. For this reason and for reasons of food hygiene, it is expedient to use stainless steel for the mold. Such a material also offers the possibility of ejecting the finished baked product from the mold after the baking operation without difficulty.

For this purpose, the use of an anti-adhesion coating on the top and the bottom molds 8,4 is possible and expedient.

The weighting piece does not come into contact with the single-use container, which after all is ultimately a food, so the weighting piece may be a simple casting.

The effect of the weighting piece is that the loaf 3 pre-formed over the mold will not change shape. The dough, produced with actual activating agents, such as baking powder or yeast, in an ordinary baking operation would nevertheless exhibit raising processes due to the constituents of flour, oil and water and roll crumbs. By the pressure of the weighting piece 9, the dough is held together so that no bubbles will form. At the same time, the aforementioned glossy coating is produced.

The baking time generally depends on the thickness of the dough, and the thickness of the dough depends in turn on the intended firmness of the single-use container. The thinner the loaves 3, the shorter the baking time.

After the baking operation, the entire mold is taken out of the oven, and after a cooling period of about 30 seconds, the finished single-use container can be ejected from the mold. It then finally cools to room temperature.

The finished baked single-use container is comparatively strong. It can contain semifluid salads, soups or desserts without becoming soaked through in a short time. Therefore it becomes possible for example to pack semifluid salads without their softening the single-use container within a period of 5 to 6 hours or longer.

The single-use container is in the first place completely degradable, but in the second place, it may alternatively be consigned to the feed industry together with leftover foods. Thus a high ecological compatibility is achieved.

What is claimed is:

1. A method of producing a single-use container from a dough comprising the steps:

mixing the dough, having:

a proportion by mass A of water in the range of $A_{min}$ of about 30%, and $A_{max}$ about 35%;

a proportion by mass B of a cereal flour blend of wheat and rye flour such that B is about 50%, and contains a proportion by mass $B_W$ of wheat flour and a proportion by mass $B_R$ of rye flour with the relationship, $1\% \leq B_W \leq 49\%$ and $B_R$ is about $50\% - B_W$;

a proportion by mass C of meal from comminuted dried baked goods, with C being about 10%, and a proportion by mass D of vegetable oil, such that D is about $A_{max} - A + 5\%$;

placing at least a portion of said dough into a two-part mold having steam vents therein; and baking said dough in said mold.

2. The method according to claim 1, wherein said dough mixing step includes the step of adding a flavoring substance to the dough.

3. The method according to claim 1, wherein said dough forming includes the step of adding a coloring substance to the dough.

4. The method according to claim 1, wherein $B_W$ is about $B_R$.

5. The method according to claim 1, wherein the following proportions by mass are employed in the mixing step:

A is about 34.9%

$B_W$ and $B_R$ are substantially equal and about 24.9% each;

C is about 10.0%;

D is about 5.0%; and a further proportion by mass E of about 0.3% common salt is also included.

6. The method according to claim 1, further comprising the step of forming a slab of dough, and wherein said at least a portion of said dough is a part of said slab.

7. The method according to claim 1, wherein said at least a portion of said dough is in the form of a ball and is shaped by assembling the mold.

8. The method according to claim 1, wherein the pressure in the mold is kept substantially constant during said baking step.

9. The method according to claim 8, wherein the substantially constant pressure is maintained by compressing at least a portion of the mold by gravity.

10. The method according to claim 9, wherein said baking step is performed by placing the dough-filled mold in a circulating-air hearth and baking at approximately 200° C. for 20 to 30 minutes.

11. The method according to claim 9, wherein said baking step is performed by directly heating the mold and contact baking for about 2 to 6 minutes.

12. The method according to claim 9, wherein said mold is made of a microwave-compatible material, and said baking step includes exposing the dough-filled mold to microwave radiation.

13. The method according to claim 1, further comprising the step of applying a water-repellent coating to the single-use container after said baking step.

* * * * *